United States Patent [19]

Bruce et al.

[11] Patent Number: 5,553,092
[45] Date of Patent: Sep. 3, 1996

[54] SOLID STATE LASER WITH INTEGRAL OPTICAL DIFFUSER PLATE TO HOMOGENIZE OPTICAL PUMPING

[75] Inventors: Lennox C. Bruce, Parsippany; William R. Rapoport, Bridgewater both of N.J.

[73] Assignee: AlliedSignal Inc., Morris Township, N.J.

[21] Appl. No.: 356,040

[22] Filed: Dec. 14, 1994

Related U.S. Application Data

[63] Continuation of Ser. No. 245,176, May 17, 1994, Pat. No. 5,331,652.

[51] Int. Cl.$^6$ .................................................. H01S 3/093
[52] U.S. Cl. ............................................. 372/72; 372/34
[58] Field of Search ................................ 372/92, 72, 34

[56] References Cited

U.S. PATENT DOCUMENTS

| | | | |
|---|---|---|---|
| 3,582,816 | 6/1971 | Waszak | 372/72 |
| 4,429,394 | 1/1984 | Guch, Jr. | 372/72 |
| 4,601,038 | 7/1986 | Guch, Jr. | 372/72 |
| 4,730,324 | 3/1988 | Azad | 372/72 |
| 4,805,181 | 2/1989 | Gibson et al. | 372/72 |
| 4,858,243 | 8/1989 | Bar-Joseph | 372/72 |
| 4,894,837 | 1/1990 | Difonzo et al. | 372/72 |
| 4,899,347 | 2/1990 | Kuchar | 372/33 |
| 4,989,215 | 1/1991 | Winik | 372/72 |
| 5,081,636 | 1/1992 | Bishop | 372/72 |

FOREIGN PATENT DOCUMENTS 2193371A  2/1988  United Kingdom ............ 3/091

OTHER PUBLICATIONS

"The Influence of Ultra-Violet Cut-Off Filters on the Performance of a 300 W Cr: Nd: GGG Slab Laser", Q. Lu, et al., Optics and Laser Technology, vol. 24, No. 5, 01 Oct. 1992.

*Primary Examiner*—Leon Scott, Jr.
*Attorney, Agent, or Firm*—Verne E. Kreger, Jr.

[57] ABSTRACT

An optical diffuser plate disposed between a flashlamp and a solide state laser within a solid state laser pump chamber. The optical diffuser plate acts as a homogenizer of the pump light to reduce pumping inhomogeneities inherent with specular reflectors, while at the same time providing an efficient energy transfer from the flashlamp to the solid state laser. The optical diffuser plate can also filter out pump light below critical wavelengths that can be detrimental to the solid state laser.

11 Claims, 2 Drawing Sheets

SOLID STATE LASER WITH INTEGRAL OPTICAL DIFFUSER PLATE TO HOMOGENIZE OPTICAL PUMPING

This application is a continuation of application Ser. No. 08/245,176, now U.S. Pat. No. 5,331,652 filed May 17, 1994.

BACKGROUND OF THE INVENTION a. Field of the Invention

The present invention relates generally to solid state laser rods, and more particularly to flashlamp pumping of solid state laser rods.

b. Description of Related Art

Solid state lasers are those in which the gain medium is a solid material usually having the form of an elongated cylindrical rod. Typically, the rod is composed of crystalline material, a glass or a plastic doped with an active ion such as $Nd^{3+}$ or $Cr^{3+}$, which provides lasing action in a laser resonator defined by a pair of mirrors. In such lasers, the solid state laser rod reaches an active state ready to provide laser gain upon exposure to the light from a flashlamp. The light from the flashlamp is directed to the laser rod by a reflector. Applications of such solid state lasers include medical, machining and military uses. Solid state lasers are advantageous in that they are compact, reliable for long term use and easily replaced in the field.

Two types of pump chamber reflectors have dominated laser designs—reflectors that are specular in nature and those that are diffuse. Typical specular pump chambers are made of highly polished surfaces that are coated to enhance the reflectivity of the pump light. Specular reflectors are generally well defined shapes and provide high light transfer efficiency but less uniformity of gain distribution. Therefore, flashlamp pumping of the laser rod gain media can create localized high gain areas when using specular reflectors.

Typical diffuse pump chamber reflectors are made from ceramics and require that the pump chamber be very compact since it is a non-imaging system. The transfer efficiency of the energy from the flashlamp to the laser media is highly dependent on the cross-sectional area of the pump chamber in relation to the cross-sectional area of the laser media. The transfer efficiency of a pump chamber also depends on the number of reflections off the reflective surfaces and the loss incurred at each reflection. The uniformity is generally very high since the laser media is bathed in a nearly homogeneous pump light field. Diffuse pump chambers generally have a higher uniformity of gain distribution but a lower efficiency than specular pump chambers.

SUMMARY OF THE INVENTION

The present invention is a solid state laser pump chamber that combines an efficient specular pump chamber reflector with an optical pump light diffuser plate that acts as a homogenizer of the pump light to reduce pumping inhomogeneities inherent with specular reflectors. The reduction of the pumping inhomogeneities greatly reduces the problem of optical damage to the laser gain media and associated optical components by reducing areas of high gain, thus eliminating optical "hot spots." The optical plate has sufficient diffuse properties so that energy transferred from the lamp to the laser rod remains high while localized gain distributions in the laser media are smoothed. This invention allows for the efficient energy transfer of a specular pump chamber and combination of a more uniform optical pumping of a diffuse pump chamber. The optical diffuser plate can also act as a solarization prevention plate which optically filters out pump light below critical wavelengths that can be detrimental to the gain media.

It is therefore an object of the invention to provide a solid state laser pump chamber that combines the benefits of specular reflectors and diffuse reflectors previously used independently in the prior art.

It is an advantage of the invention that it creates a more reliable laser through the reduction of peak fluence of the laser beam which can cause optical damage to components inside and outside of the laser.

Additional objects, advantages and novel features of the invention will be set forth in part in the description which follows, and in part will become apparent to those skilled in the art upon examination of the following or may be learned by practice of the invention more specifically identified in the appended claims.

BRIEF DESCRIPTION OF THE DRAWINGS

The invention will be more fully understood and further advantages will become apparent when reference is made to the following detailed description and the accompanying drawings, in which.

DETAILED DESCRIPTION OF THE INVENTION

The following detailed description, which describes only the preferred embodiment of the invention, is understood only to be an illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

Figure 1:
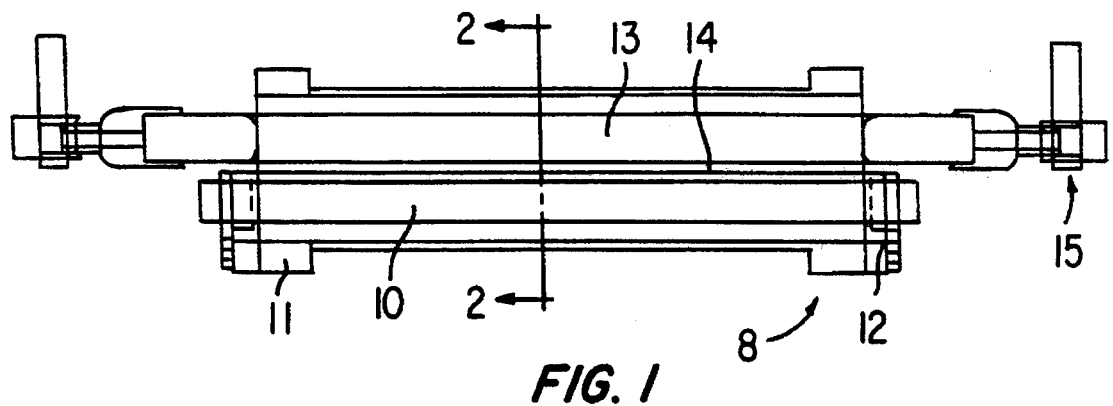
FIG. 1 is a sectional elevation view of a laser pump chamber incorporating the present invention.
Figure 2:
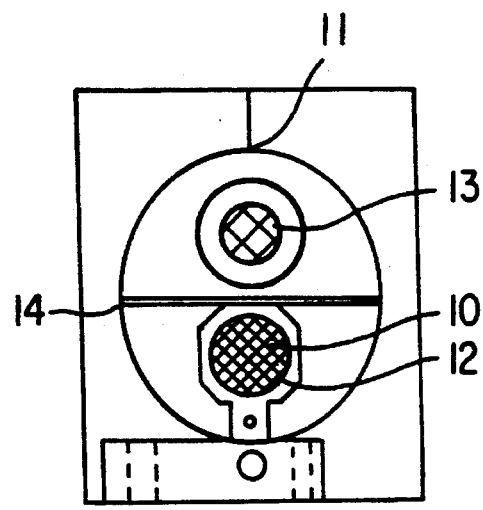
FIG. 2 is an alternate view of the laser pump chamber of FIG. 1.

Referring to FIGS. 1 and 2 of the drawings, there is shown generally at 8 a laser pump chamber incorporating an optical diffuser plate 14 that is the subject of this invention. The pump chamber comprises a solid state laser rod 10, a specular pump chamber reflector 11, rod holders 12, a flashlamp 13, an optical diffuser plate 14, and lamp holders 15. Preferably, the pump chamber is of a gas-cooled construction as disclosed in U.S. patent application, Ser. No. 08/034,993, now U.S. Pat. No. 5,331,652 to Rapoport et al., the disclosure which is hereby incorporated by reference.

The reflector 11 is specular and imaging in nature and has a vacuum deposited silver coating that is protected by a silicon dioxide layer and is highly polished. Preferably, the ends of the reflector 11 are open and symmetric to allow for a forced preselected gas to adequately cool the flashlamp 13 and the laser rod 10. Preferably, flashlamp 13 is made of quartz with Xe gas fill. Rod holders 12 are constructed to minimize the cross section of the holder in the preselected gas flow stream and to capture the optical diffuser plate 14.

In one preferred embodiment of the laser pump chamber 8 the laser rod 10 is composed of alexandrite, and the optical diffuser plate 14 is disposed between the lamp 13 and the laser rod 10. Optical diffuser plate 14 is generally coplanar and preferably extends from oppositely disposed sidewalls of reflector 11 as shown in FIG. 2. Optical plate 14 is about 0.020 inches thick and has a small cross-sectional area so that it may be placed inside the specular pump chamber without significant perturbations to the cooling preselected gas flow stream. The optical diffuser plate 14 has a top surface face adjacent to the lamp 13 and a bottom surface face adjacent to the laser rod 10. The top face may be uncoated, but perferably has an anti-reflection coating to increase the energy transmission level. The bottom face is roughly polished diffuse for low transmission loss. The most important characteristic of the bottom face diffuser is that the back scatter be low and the light transmission be high. Preferably plate 14 is made from Corning 7940 Pyrex® glass or alternatively, Corning 7059 barium borosilicate. Other materials are possible so long as plate 14 can be manufactured in thin sheets, is shock resistance as compared with a low expansion glass, and has a softening point that is higher that the expected operating temperatures at the plate.

Figure 3:
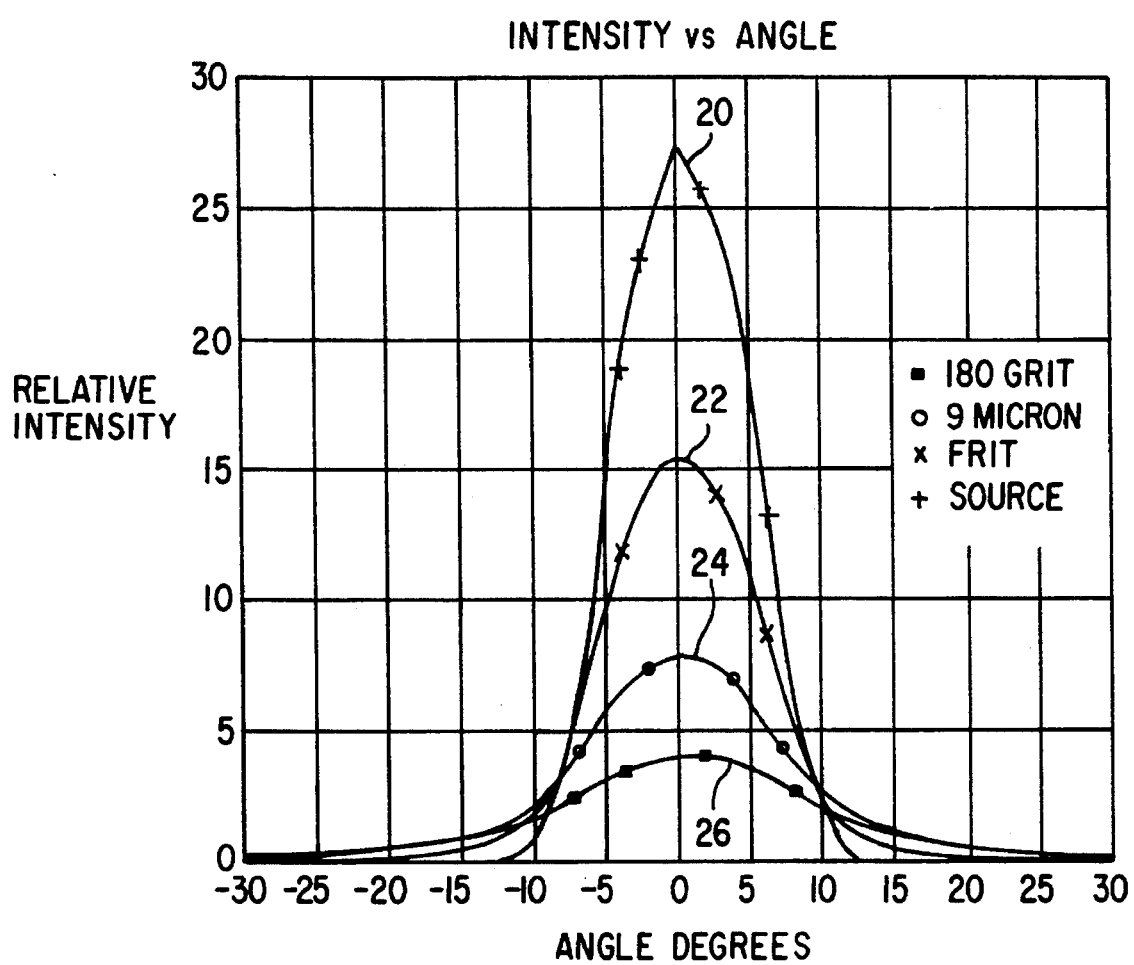
FIG. 3 is a graphical representation of the reflective nature of certain diffuse media.

The optical diffuser plate 14 can be manufactured by determining the amount of diffuseness required to remove the "hot spots" from the laser media. In this method the transmission of the plate is maximized allowing the highest energy transfer from the flashlamp to the laser media. FIG. 3 graphically illustrates light intensity levels as a function of angle for three types of diffusers compared with the light source, curve 20. The most common diffusers are fabricated by grinding and polishing one surface of the plate 14 as depicted in FIG. 3 as 9 micron and 180 Grit, curves 24 and 26 respectively, which refer to the grit wheel and the polish used. These types of diffusers readily diffuse the incident light, but at the expense of light transmission as defined as the ratio of the areas under the respective curves. The 180 grit finish transmits 28 percent of the light, and the 9 micron finish transmits 42 percent of the light.

The preferred type of diffuser is glass frit bonded to the polished plate, shown in curve 22. The frit sample in curve 22 transmits 66 percent of the source light which is considerably higher than 180 grit or 9 micron, and the FWHM (full width, half maximum) angular spread is the smallest. The frit type diffuser is manufactured by taking a plain polished plate of the preferred material above and sifting a 400 mesh glass frit power to the surface until visible lines drawn beneath the plate are mostly obscured by the frit powder. The plate is heated in an oven by ramping the temperature above the melting point of the frit. The plate is soaked for a prescribed amount of time and then the temperature is ramped down to room temperature.

Preferably, the frit power is SP274, ground to a 400 mesh, made by Specialty Glass of Oldsmar, Fla., which has a fiber softening point of 664° C. and an expansion coefficient of $66 \times 10^{-7}$ and an index of refraction of 1.499. The frit is solidified by ramping the temperature up to 730° C. in 20 minutes, soaking the plate for 20 minutes and cooling down to room temperature in 30 minutes. Alternatively, many different types of vitrifying frits can be used for this application where the final solidified frit is transparent. Furthermore, losses can be reduced by matching the refractive indices of the plate and frit.

Optionally, for an application using an alexandrite laser, optical diffuser plate 14 material is selected so that it is operative to prevent transmission of light having wavelengths below 300 nm, thereby preventing solarization of the alexandrite. Diffusers for other laser material can also be selected to prevent transmission of light having wavelengths that would otherwise cause solarization.

The laser pump chamber 8 which has been disclosed herein can, of course, be modified in various ways without departing from the scope of the invention. It is also possible to create a diffuser plate through acid etching techniques, photolithography of replicated shapes and holographic patterns. Each of these techniques can realize a more uniform pumping field, which reduces localized "hot spots". This in turn reduces the probability of optical damage to the components inside and outside of the laser.

The pump chamber is not required to have open ends to allow a preselected gas flow parallel to the laser rod, flashlamp, and optical diffuser plate. The pump chamber may be sealed on ends. The invention which improves pumping uniformity may be applied to flowing dye as well as pumping solid rods. The invention may also be applied to pumping with diodes instead of flashlamps. The plate can possess diffusive properties and be fabricated from material that does not add solarization prevention if the pump light is not detrimental to the gain media being pumped.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A solid-state laser pump chamber, comprising:
   (a) a solid state laser rod;
   (b) a light source pump means for providing light excitation of said laser rod;
   (c) a generally coplanar diffuser plate operatively disposed between said laser rod and said pumping means;
   (d) a specular reflector generally surrounding said laser rod, said light source and said diffuser plate; and
   (e) cooling means for circulating a cooling gas within said pump chamber;
      wherein said diffuser plate homogenizes the pump light to reduce pumping inhomogeneities and does not perturb the cooling gas flow stream.

2. The pump chamber of claim 1, wherein said diffuser plate is disposed along the longitudinal axis of said light source and said laser rod.

3. The pump chamber of claim 1, wherein said diffuser plate comprises a diffuse surface adjacent to said laser rod.

4. The pump chamber of claim 3, wherein said diffuser plate comprises an anti-reflection surface adjacent to said light source.

5. The pump chamber of claim 4, wherein said diffuser plate prevents light transmission having wavelengths that would cause solarization of said laser rod.

6. The pump chamber of claim 3, wherein said laser rod is alexandrite.

7. The pump chamber of claim 5, wherein said diffuser plate prevents transmission of light having wavelengths below 300 nm to prevent solarization of said alexandrite.

8. The pump chamber of claim 3, wherein said diffuse surface is a vitrifying frit.

9. The pump chamber of claim 1, wherein said laser rod comprises chromium as its active ion.

10. The pump chamber of claim 1, wherein said diffuser plate is a low expansion glass.

11. A solid-state laser pump chamber, comprising:
   (a) an alexandrite solid state laser rod;

(b) a light source means for providing light excitation of said laser rod;

(c) a generally coplanar diffuser plate having a anti-reflection surface adjacent to said light source and a diffuse surface adjacent to said laser rod, wherein said diffuse surface comprises a vitrifying frit and said diffuser plate prevents transmission of light having wavelengths below 300 nm;

(d) a specular reflector generally surrounding said laser rod, said light source and said diffuser plate; and (e) cooling means for circulating a cooling gas within said pump chamber; wherein said diffuser plate homogenizes the pump light to reduce pumping inhomogeneities and does not perturb the cooling gas flow stream.

* * * * *